Nov. 5, 1946.  A. MACKMANN  2,410,544
METHOD OF AND APPARATUS FOR FORMING GEAR TEETH
Filed April 4, 1942  2 Sheets-Sheet 1
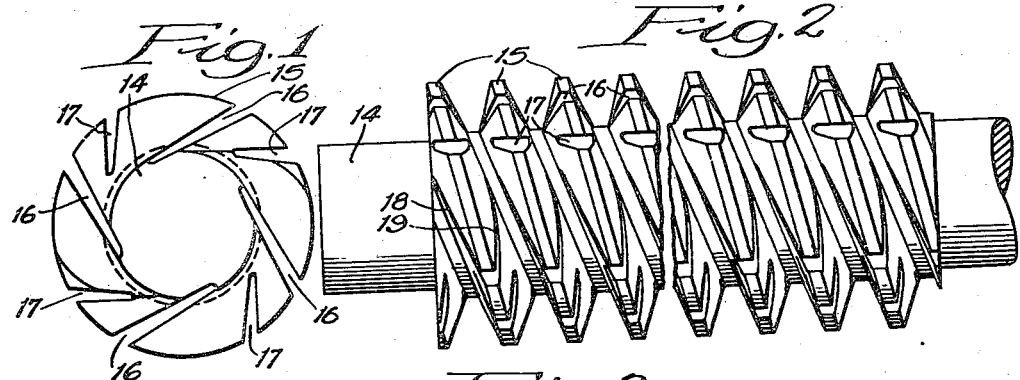
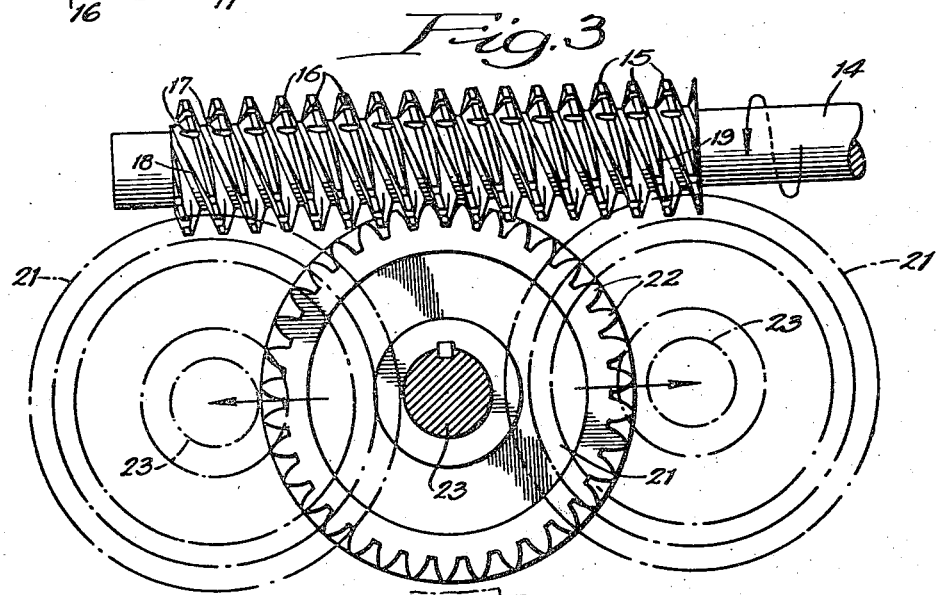
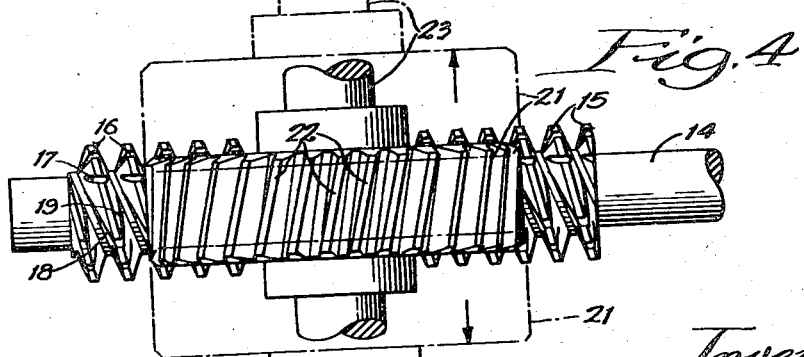
Inventor: Arthur Mackmann,
By Dawson, Ooms & Borth,
Attorneys.

Nov. 5, 1946.   A. MACKMANN   2,410,544
METHOD OF AND APPARATUS FOR FORMING GEAR TEETH
Filed April 4, 1942   2 Sheets-Sheet 2
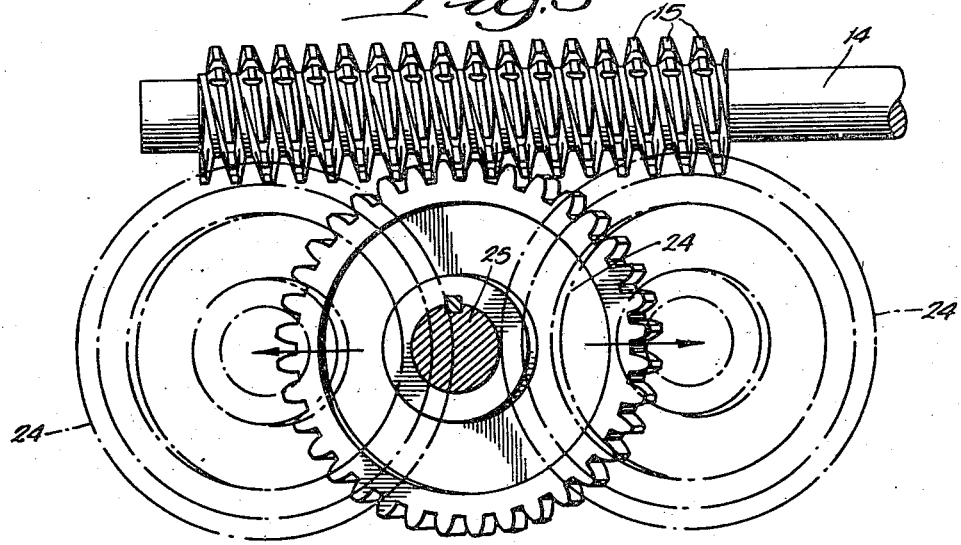
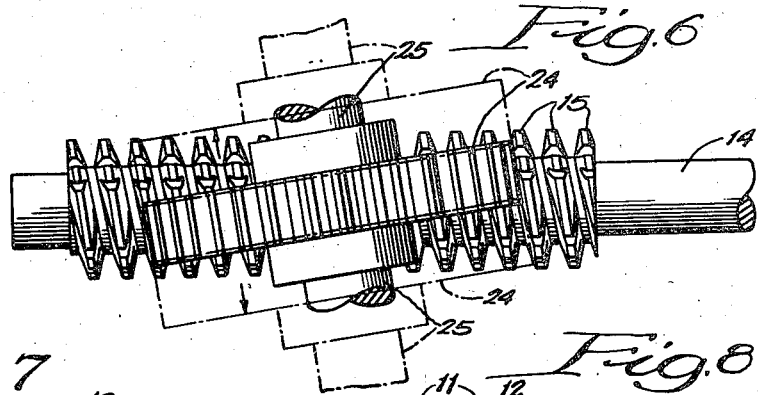
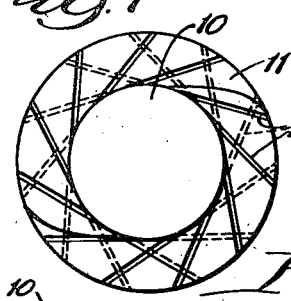
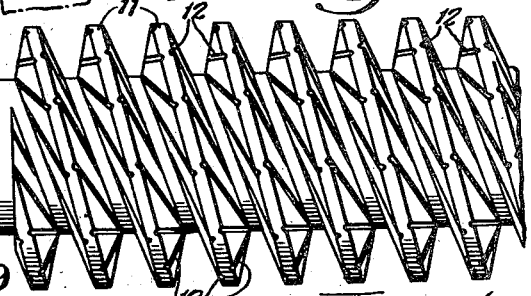
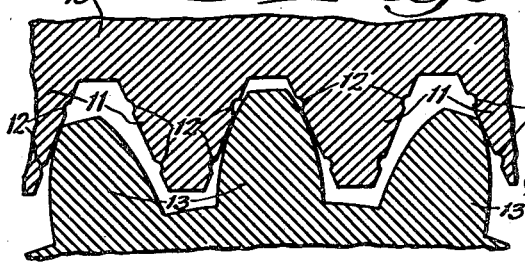

Patented Nov. 5, 1946

2,410,544

UNITED STATES PATENT OFFICE 2,410,544

METHOD OF AND APPARATUS FOR FORMING GEAR TEETH

Arthur Mackmann, Chicago, Ill., assignor to Foote Bros. Gear and Machine Corporation, Chicago, Ill., a corporation of Delaware Application April 4, 1942, Serial No. 437,645

10 Claims. (Cl. 90—1.6)

This invention relates to a method of and tool for forming gear teeth and more particularly to the finishing of gear teeth to provide a smooth very accurate surface thereon.

In the art of forming gear teeth it is the usual practice at the present time to cut the teeth in blanks by the use of toothed hobs or cutters. It is extremely difficult to form the cutting teeth on such hobs accurately and is impossible to keep them accurate in use, particularly as any regrinding or sharpening changes their size or configuration due to the necessity of relieving the teeth behind their cutting edges.

Therefore, to obtain accurate gear teeth, it has been necessary to use a shaving or finishing operation after hobbing the blanks.

Shaving or finishing tools for straight spur gear teeth have been employed which are moved back and forth along the length of the teeth and with which very satisfactory results can be obtained. Such tools, however, are expensive and have a short life, sharpening being very difficult and more than a very few resharpenings being impossible.

Finishing of worm gears where a high degree of accuracy is required has heretofore been possible only by hand and this is a very tedious and expensive operation.

The present invention has for one of its objects to provide a method of and a tool for finishing gear teeth by which either worm or spur type gears can be finished quickly and efficiently with a high degree of accuracy.

Another object of the invention is to provide a tool for forming gear teeth which is relatively simple and inexpensive to manufacture and which will have a long useful life. According to one important feature the tool requires no relieving back of its cutting edges and can therefore be resharpened an indefinite number of times until it is almost completely worn away.

Still another object of the invention is to provide a method of and tool for forming gear teeth in which a cutting edge tangent to a base circle is moved about the center of the circle across the sides or faces of the teeth to be formed.

The above and other objects advantages and desirable features of the invention will be more readily apparent from the following description when read in connection with the accompanying drawings, in which—

Figure 1 is an end view of a tool embodying the invention;

Figure 2 is a side elevation of the tool;

Figure 3 is a top plan view illustrating the cutting of a blank with the tool;

Figure 4 is a side elevation looking from the bottom of Figure 3;

Figure 5 is a view similar to Figure 3 illustrating the cutting of straight spur gear teeth;

Figure 6 is an elevation looking from the bottom of Figure 5;

Figure 7 is an end view of an alternative tool construction;

Figure 8 is a side view of the tool of Figure 7; and

Figure 9 is a section illustrating engagement of the tool of Figures 7 and 8 with a gear.

According to the present invention, the teeth in a blank are first formed as accurately as possible either by form cutting or hobbing or by any other one of the known conventional gear cutting processes to approximately their final shape and size and are then adapted to be finished to provide accurate tooth surfaces according to the method of and with the tool of the present invention. The invention is illustrated in connection with involute or approximately involute gear teeth although it is applicable also to other tooth forms.

The tool employed constitutes in effect a master worm which is formed as accurately as possible and which will tend to reproduce in the gear perfect mating surfaces. Since the worm tends to produce a constant velocity in the gear, its cutting or shaving action on the gear teeth will remove any irregularities in the gear teeth as to tooth size, shape and eccentricity. Thus a gear may be finished on its working shaft and will be perfectly concentric therewith.

In order that the tool may cut or scrape the gear to remove material therefrom the flanks of the teeth thereon are provided with one or more cutting edges lying along lines tangent to a cylinder coaxial with the tool. If such cutting edges were radial to the tool it would be necessary to relieve the tool body behind them in order to cut but I have found that by cutting grooves or slots in the flanks of the teeth along lines tangent to a circle concentric with the tool no relief is necessary. In one preferred form the cutting edges are formed to lie in planes tangent to the base cylinder of the tool but this is not essential, it being sufficient that the cutting edges lie in planes tangent to any cylinder coaxial with the tool whether of the same size as or smaller than the base cylinder of the tool. Another way of expressing the location of the cutting edges is that they lie in planes subtending chords less than a semi-cylinder in a cylinder circumscribing the outside diameter of the worm.

Figures 7, 8 and 9 illustrate one form of tool embodying the invention, which comprises a cylindrical body 10 having formed thereon helicoidal teeth 11. As shown, in Figure 8, the tool is in the form of a double worm but it will be understood that a worm form having one or more helical teeth thereon can be utilized equally well.

The surfaces of the helical teeth on their opposite faces are formed with a series of gashes or slots 12 each lying substantially tangent to the cylindrical body 10 and extending throughout the surface of the teeth to the outer ends thereof. These gashes form cutting edges in the surface of the teeth which edges lie in the plane of the tooth surface in the helicoidal line of action thereof. Since no relieving of the teeth behind the cutting edges is necessary it will be apparent that the tool can be sharpened an indefinite number of times simply by enlarging the grooves or slots 12 on one or both sides thereof to renew the cutting edges.

Figures 1 and 2 illustrate another type of tool which is somewhat simpler and less expensive to manufacture than that of Figures 7 and 8 but which functions in substantially the same way. This tool comprises a cylindrical body 14 having a double helical thread 15 thereon. Instead of forming gashes or slots in the opposite thread faces, in this instance a plurality of elongated gashes or slots 16 are cut throughout the length of the threads in a plane parallel to the axis of the cylindrical body and lying substantially tangent at one side to the surface thereof. If desired, in order to increase the number of cutting edges additional slots 17 similarly formed may be cut in the teeth between the slots 16. The slots 16 and 17 are substantially identical except that the slots 16 extend throughout the full tooth depth into the cylindrical body while the slots 17 terminate short of the root diameter of the threads, the principal purpose of this feature being to increase the strength of the cutting teeth.

It will be noted particularly from Figure 2 that the cutting edges formed by the slots 16 and 17 on one side of the teeth 15 lie in a substantially straight line as shown at 18, this line corresponding to the helicoidal line of action of the teeth. On the opposite side of the teeth, since the slots are not truly tangent to the cylindrical body at this point due to the helix angle of the teeth, the cutting edges formed by the slots are curved as shown at 19. This curvature will exist in any cutting edge not lying along the helicoidal line of action of the worm tooth, as for example if the slots are cut tangent to a cylinder other than the base cylinder of the tool, but I have found that the tool operates efficiently whether or not the cutting edges are straight or curved as shown.

Figures 3 and 4 illustrate method of using this tool to cut or shave teeth 22 on a blank 21, which can be either a "concave face worm gear" or a helical spur gear. According to this method the cylindrical body 14 may be power driven by any suitable machine and the blank 21 may be mounted on a shaft 23 which is rotatable and which is arranged at right angles to the axis of the body 14. The tool may then be moved into the body or conversely, the tool turning the body through the gear teeth 22 at a rate depending on the relative ratios therebetween. As soon as any tightness occurs shaving or cutting of the teeth 22 will take place, the axis of the body 14 and the shaft 23 being moved gradually together during the cutting operation until the desired center distance has been reached.

During the cutting operation either the body 14 or the shaft 23 is moved in a direction parallel to the axis of the body between the two relative extremes of movement indicated by dotted lines in Figure 3. This operation produces an even rate of wear on the tool throughout its length and compensates for any minor inaccuracies in the tool formation. To form a worm gear these three movements, namely, rotation of the tool, feeding of the tool radially into the gear, and relative movement along the tool, are all that are necessary and it has been found that the resulting worm gear will have a highly accurate and smooth surface showing substantially no tool marks.

The operation as just described will form a worm gear with a zero back lash relative to the tool and if a worm corresponding exactly in size to the tool is used with the gear, the back lash will be substantially zero. If it is desired that some back lash should be obtained to provide a greater freedom of movement, the teeth on the tool may be made slightly thicker than those of the worm with which the gear is to be used. An alternative method of accomplishing the same result is to provide a load on the shaft 23 tending to resist turning thereof so that the tool will tend to shave a slightly excessive amount of metal from each side of the gear teeth thereby providing clearance when the gear is used with a worm of the same size as the tool.

For cutting helical spur gear teeth an additional motion is introduced as illustrated in Figure 3 in a direction substantially parallel to the teeth on the blank or to the axis of the shaft 23. Since the blank is free to turn around the axis of the shaft 23 during the cutting operation, the exact direction of this movement is not material so long as it causes the gear blank to move relatively across the tool. This is shown in Figure 4 by the dotted positions of the gear at its two extremes of movement and may be produced concurrently with the tangential feed illustrated in Figure 3 and the radial feed to bring the tool and gear shafts to the proper center distance.

When this additional movement is introduced, the teeth on the gear blank will be formed uniformly throughout their length at an angle to the axis of the shaft 23 determined by the helical pitch of the teeth 15 on the cutting tool and by the angle between the cylindrical body 14 and the shaft.

For cutting straight spur gear teeth, the gear blank, as shown at 24 in Figures 5 and 6, may be mounted on a shaft 25 whose axis lies parallel to the helical teeth 15 of the tool on the cutting side. When this is done, the teeth on the tool will cut across the gear teeth at right angles to the plane of the gear and will form a concave spur gear if only the first three motions are used or a straight spur gear if the fourth motion in a direction parallel to the shaft 25 is introduced.

A tool of the type shown in Figures 1 and 2 can very easily be resharpened simply by widening the slots 16 and 17 to form new cutting edges. If preferred, to facilitate the grinding operation, one side of each of the slots may be cut away to increase the clearance for the sharpening tool. This sharpening operation can, therefore, be performed easily and quickly with conventional machinery and without affecting the size or precision of the cutting edges. It will be also noted that the motions involved in the finishing of gears either of the worm or spur type are very simple and can readily be obtained in many types of conventional machinery.

Although the invention has been described in connection with both worm and spur gears it is believed that its greatest value at the present time, at least, is in the shaving of precision worm gears. This is because there is, at present, no commercial process for the successful production of precision worm gears by power driven machinery and the present invention provides such a process by which extremely accurate gears can be produced rapidly and economically.

While two specific forms of invention have been shown and described in detail, it will be understood that numerous variations might be made therein and that the particular forms shown and described are illustrative only and are not to be taken as a definition of the scope of the invention, reference being had for this purpose to the appended claims.

What is claimed is:

1. The method of forming gear teeth which comprises forming on a blank a series of gear teeth substantially to the final tooth depth but of slightly larger section than the final tooth form, meshing with the teeth on the blank the teeth of a master worm, forming in the flanks of the worm teeth cutting edges lying in planes substantially tangential to the base circle of the worm, and driving this worm in tight mesh with the teeth of the gear blank so that as the worm is rotated said cutting edges will lie in the helicoidal line of action of the master worm to shave the gear teeth to a corresponding mating surface.

2. The method of forming gear teeth which comprises forming on a blank a series of gear teeth substantially to the final tooth depth but of slightly larger section than the final tooth form, meshing with the teeth on the blank the teeth of a master worm, forming in the flanks of the worm teeth cutting edges lying in planes substantially tangential to the base circle of the worm, driving the worm and simultaneously causing relative movement between the blank and the master worm in a direction parallel to the axis of the worm.

3. The method of forming gear teeth which comprises forming on a blank a series of gear teeth substantially to the final tooth depth but of a section slightly larger than the final tooth form, forming on a base cylinder a helical tooth of a size and shape to mesh with teeth of the final tooth form, forming in the faces of said helical tooth a plurality of cutting edges lying substantially tangent to the base cylinder, engaging the helical tooth with the teeth on the blank with the axes of the blank and the base cylinder spaced a greater distance than the normal center distance, rotating the base cylinder, and moving the axes of the blank and the base cylinder together to their normal center distance.

4. The method of forming gear teeth which comprises forming on a blank a series of gear teeth substantially to the final tooth depth but of a section slightly larger than the final tooth form, forming on a base cylinder a helical tooth of a size and shape to mesh with teeth of the final tooth form, forming in the faces of said helical tooth a plurality of cutting edges lying substantially tangent to the base cylinder, engaging the helical tooth with the teeth on the blank with the axes of the blank and the base cylinder spaced a greater distance than the normal center distance, rotating the base cylinder, moving the axes of the blank and the base cylinder together to their normal center distance, and simultaneously moving the blank and base cylinder relative to each other in a direction parallel to the axis of the base cylinder.

5. The method of forming gear teeth which comprises forming on a blank a series of gear teeth substantially to the final tooth depth but of a section slightly larger than the final tooth form, forming on a base cylinder a helical tooth of a size and shape to mesh with teeth of the final tooth form, forming in the faces of said helical tooth a plurality of cutting edges lying substantially tangent to the base cylinder, engaging the helical tooth with the teeth on the blank with the axes of the blank and the base cylinder spaced a greater distance than the normal center distance, rotating the base cylinder, moving the base cylinder and blank together to their normal center distance, and simultaneously moving the blank and base cylinder relative to each other in a direction generally parallel to the length of the teeth on the blank.

6. The method of forming gear teeth which comprises forming on a blank a series of gear teeth substantially to the final tooth depth but of a section slightly larger than the final tooth form, forming on a base cylinder a helical tooth of a size and shape to mesh with teeth of the of a size and shape to mesh with teeth of the final tooth form, forming in the faces of said helical tooth a plurality of cutting edges lying substantially tangent to the base cylinder, engaging the helical tooth with the teeth on the blank with the axes of the blank and the base cylinder spaced a greater distance than the normal center distance, and simultaneously moving the blank and the base cylinder relative to each other in directions parallel to the axis of the base cylinder and to the length of the teeth on the blank.

7. A tool for forming gear teeth comprising a master worm having a helical tooth of a size and section complementary to that of the teeth to be formed, the helical tooth having formed in its flanks cutting edges lying in planes tangent to the base cylinder of the worm and substantially coinciding with the helicoidal line of action of the tooth.

8. A tool for forming gear teeth comprising a master worm having a helical tooth of a size and section complementary to that of the teeth to be formed, the helical tooth having cut away portions in its flanks to provide cutting edges in the flank surfaces in planes tangent to the base cylinder of the worm and substantially coinciding with the helicoidal line of action of the tooth.

9. A tool for forming gear teeth comprising a master worm having a helical tooth of a size and section complementary to that of the teeth to be formed, the helical tooth having a slot cut therein in a plane tangent to the base cylinder of the worm and extending through the tooth to form cutting edges on both flanks thereof.

10. A tool for forming gear teeth comprising a master worm having a helical tooth of a size and section complementary to that of the teeth to be formed, the helical tooth having a plurality of slots extending through the several turns thereof and lying in planes tangent to the base cylinder of the worm, certain of the slots extending completely through the depth of the tooth into the worm body and the other slots terminating short of the root of the worm thread.

ARTHUR MACKMANN.